April 29, 1969  B. D. MORGAN  3,441,729
SAFETY HEADLIGHT
Filed May 23, 1967
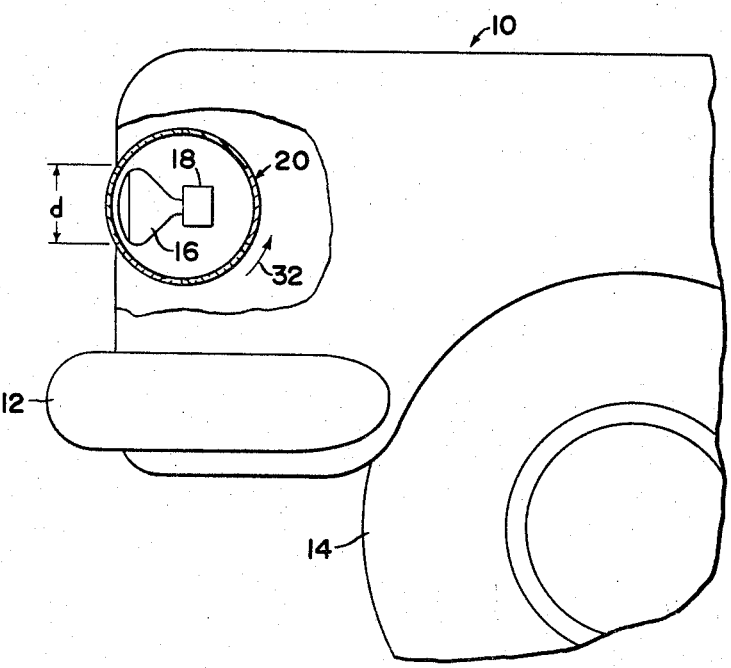
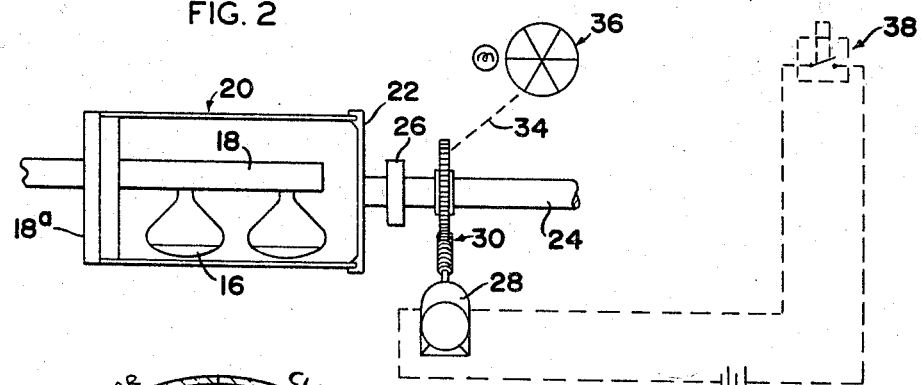
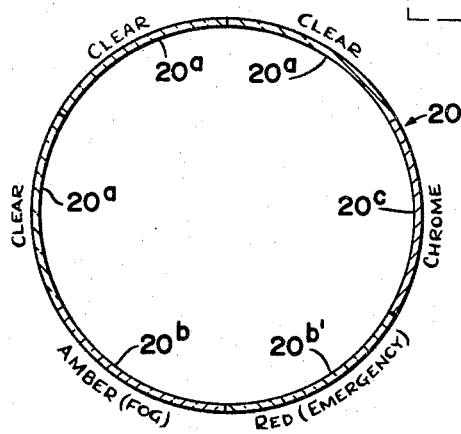
INVENTOR.
BURTON D. MORGAN
BY
Oldham & Oldham
ATTORNEYS.

United States Patent Office 3,441,729
Patented Apr. 29, 1969

---

3,441,729
SAFETY HEADLIGHT
Burton D. Morgan, 302 Aurora St.,
Hudson, Ohio 44236
Filed May 23, 1967, Ser. No. 640,592
Int. Cl. B60q 1/04
U.S. Cl. 240—7.1      6 Claims

ABSTRACT OF THE DISCLOSURE

A vehicular headlight assembly formed from a lamp mounted on the vehicle and a rotatable, cylindrical body which encapsulates the lamp. The body has several arcuate surfaces which can be selectively rotated into position in front of the lamp to provide different lens mediums therefor.

---

This invention relates to a vehicular headlight assembly characterized by a rotatable cylindrical body which encapsulates the headlight lamp. Means are provided whereby the cylindrical body can be selectively rotated so that different arcuate portions of the body can be moved in front of the headlight lamp to provide a new lens medium for the lamp. Some of the arcuate portions of the body are of a clear, transparent material so that selectively rotating the body presents a clean headlight surface after the vehicle is splashed with mud or salt. Other arcuate portions are tinted so that the headlight lamp can function as an emergency light or a fog light. Still another arcuate surface is chrome-plated with this surface being moved in front of the lamp to conceal it during daytime driving.

For a more detailed description of the headlight assembly, reference should be had to the accompanying sheet of drawings wherein:

FIG. 1 is a partially broken-away, diagrammatic side elevation of a vehicle in which a preferred embodiment of the headlight assembly is incorporated;

FIG. 2 is a partially broken-away plan view of the safety headlight assembly of the invention, with a portion of the assembly being shown diagrammatically; and FIG. 3 is a transversely directed, vertical cross-section of the cylindrical body of the headlight assembly, particularly illustrating the various lens surfaces thereof.

In the drawings, and referring first to FIG. 1, the numeral 10 generally indicates the front end or forward portion of a vehicle such as an automobile. The vehicle 10 has a bumper 12 and tires 14 all associated with the vehicle in known fashion. Mounted on the vehicle 10 are a plurality of headlight lamps 16 which are fixedly secured to a portion of the frame 18 of the vehicle. Suitable wiring, not shown, connects the lamps 16 to a suitable power source of the vehicle, such as a battery, not shown. The mounting of the lamps 16 to the vehicle 10 and the wiring thereof is accomplished in standard and known fashion.

The main feature of the present invention is to provide a cylindrical body, generally indicated by the numeral 20, which encapsulates the lamps 16 and the frame portion 18 to which the lamps 16 are secured. As is best illustrated by FIG. 2, the cylindrical body 20 is journalled to the frame 18 on one end and at the other end is secured in known manner to a plate 22 mounted or formed on one end of a suitable drive shaft 24. Usually a two piece removable end cap 18a closes the open end of the body 20. The drive shaft 24 is adapted to selectively rotate the cylindrical body 20 and for this purpose the drive shaft 24 is journalled to the frame by suitable bearings 26 and is driven by electric motor 28 working through conventional connecting means such as a worm gear mechanism 30. As can be seen by FIGS. 1 and 2, selective actuation of the motor 28 achieves a rotation of the cylindrical body 20 in the direction of arrow 32. Suitable electrical controls provide for a step by step arcuate drive of the motor.

The cylindrical body 20, as is best illustrated by FIGS. 1 and 3, is formed from a combination of clear, transparent arcuate portions 20a and tinted translucent arcuate portions 20b and 20b¹. The lamp 16 is associated with the cylindrical body 20 wherein as motor 28 is actuated one of the arcuate portions of the body rotates to a position in front of the lamp 16 in order to provide a diverging concavo-convex lens surface or lens medium for the lamp 16. As is illustrated by FIG. 1, each separate arcuate portion or lens surface of the cylindrical body 20 has a chord of the distance d which is equal to the headlight opening provided in the front of the vehicle 10. Such a feature allows a new lens surface to be moved in front of the lamp 16 by simply actuating the drive motor 28. For example, after the vehicle 10 is splashed with mud, salt, etc., three clear transparent lens surfaces 20a are provided on the body 20 as shown herein so that any one of these three can be moved in front of the lamp 16 to provide a clean headlight surface.

As was explained hereinbefore, arcuate portions 20b and 20b¹ are tinted with an amber and a red, respectively, so that such arcuate portions 20b can be rotated in front of the lamp 16 to allow the headlight to function as an emergency light or as a fog light. Still another arcuate surface 20c is provided with a chrome plating so that this arcuate surface can be rotated in front of the lamp 16 to conceal the headlight during daytime driving.

It should be realized that although only one headlight assembly is shown, driveshaft 24 can extend to the other headlight assembly on the front of the vehicle with that assembly being the same as the one illustrated whereby rotation of both of the cylindrical bodies 20 can be achieved by actuation of drive motor 28. FIG. 2 also illustrates in diagrammatic fashion an indicator cable 34 connecting the worm gear mechanism 30 with a dash indicator unit 36 provided on the dash of the vehicle 10, which unit is adapted to indicate the precise arcuate surface, i.e., clear, amber, red, or closed, which is positioned in front of lamps 16. A control 38 is also provided on the dash of the vehicle so that motor 28 can be automatically actuated to achieve a selective rotation of the cylindrical body 20. In this manner the operator of the vehicle can, while sitting behind the wheel of the vehicle, operate the safety headlight assembly in order to selectively change the lens medium provided for the lamp 16. It should be understood that drive motor 28 will automatically shut off after rotating the body 20 through the distance of chord d so that the new lens surface is properly positioned in front of lamp 16.

Although the cylindrical body 20 can be made from any suitable material, it is believed that the best results can be obtained by constructing the cylindrical body 20 from a rigid, durable, transparent plastic such as "Plexiglas," or from glass. In this instance, the body 20 would be constructed from a one-piece annular plastic cylinder with the amber and red arcuate portions being formed by suitably tinting longitudinally extending arcuate portions of the cylinder. The chrome-plated arcuate surface in this instance could be provided by merely securing a longitudinally extending strip of chrome to an arcuate portion of the annular ring, or by suitable deposit of a chrome plating on the desired area of the body 20.

Of course, the colored arcuate portions 20b can be made or formed by a variety of methods. For example, longitudinally extending portions of the clear plastic body can be painted to obtain the different colors of the body. Another method of forming arcuate portions 20b would be to secure in suitable fashion tinted flexible plastic sheets or strips to a longitudinally extending portion of the body. It also would be quite feasible to form arcuate portions 20b from colored plastic strips which actually form a special section of the cylindrical body 20.

While a certain representative embodiment and details have been shown for the purpose of illustrating the invention, it will be apparent to those skilled in the art that various changes and modifications may be made therein without departing from the spirit or scope of the invention.

What is claimed is:

1. A vehicular headlight assembly including a lamp fixedly mounted on the forward portion of the vehicle characterized by a cylindrical body encapsulating said lamp, said body being formed from a combination of clear transparent arcuate portions and tinted translucent arcuate portions, and means for selectively rotating said body about said lamp whereby various diverging concavo-convex lens surfaces can be selectively moved in front of said lamp to provide different lens mediums therefore.

2. The combination according to claim 1 wherein said means for rotating said body include
   a drive shaft secured to said body and journalled to the frame of the vehicle and
   motor means for selectively driving said drive shaft to effect rotation of said body.

3. The combination according to claim 1 and including indicator means mounted to the dash of the vehicle and operatively associated with the means for rotating the body for indicating which lens surface is positioned in front of said lamp.

4. The combination according to claim 1 wherein said body is formed from a durable, rigid plastic cylindrical drum, the arcuate portions thereof which form the lens surfaces extending longitudinally of the drum.

5. The combination according to claim 2 wherein said vehicle has more than one lamp mounted on the forward portion of the vehicle with a body encapsulating each lamp, said drive shaft being secured to each body whereby rotation of said drive shaft effects rotation of the bodies encapsulating each lamp.

6. A vehicular headlight assembly including a lamp fixedly mounted on the forward portion of the vehicle characterized by a transparent cylindrical body encapsulating said lamp, said body having different light transmitting properties in longitudinally extending sections thereof, said body positioned in the vehicle whereby only one light transmitting section is exposed at one time, and control means to rotate said body to move a different light transmitting section to an exposed position.

References Cited

UNITED STATES PATENTS

| 2,300,097 | 10/1942 | Briehl | 240—46.03 |
| 2,515,236 | 7/1950 | Kunins | 240—3.1 |
| 3,071,684 | 1/1963 | Ruth | 240—46.03 |
| 3,310,669 | 3/1967 | Dils | 240—7.1 |

NORTON ANSHER, *Primary Examiner.*

DAVID S. STALLARD, *Assistant Examiner.*

U.S. Cl. X.R.

240—46.59, 46.05